July 14, 1942.  V. D. CANFIELD  2,289,342
ROTARY ENGINE
Filed Aug. 17, 1940   4 Sheets-Sheet 1

INVENTOR
Virgil David Canfield
BY
ATTORNEY

July 14, 1942.   V. D. CANFIELD   2,289,342
ROTARY ENGINE
Filed Aug. 17, 1940    4 Sheets-Sheet 2

INVENTOR
Virgil David Canfield
BY
ATTORNEY

July 14, 1942.  V. D. CANFIELD  2,289,342
ROTARY ENGINE
Filed Aug. 17, 1940                    4 Sheets-Sheet 3
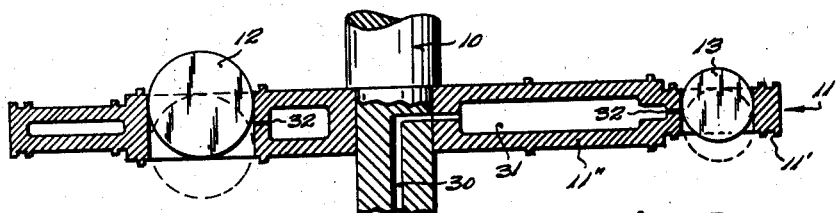
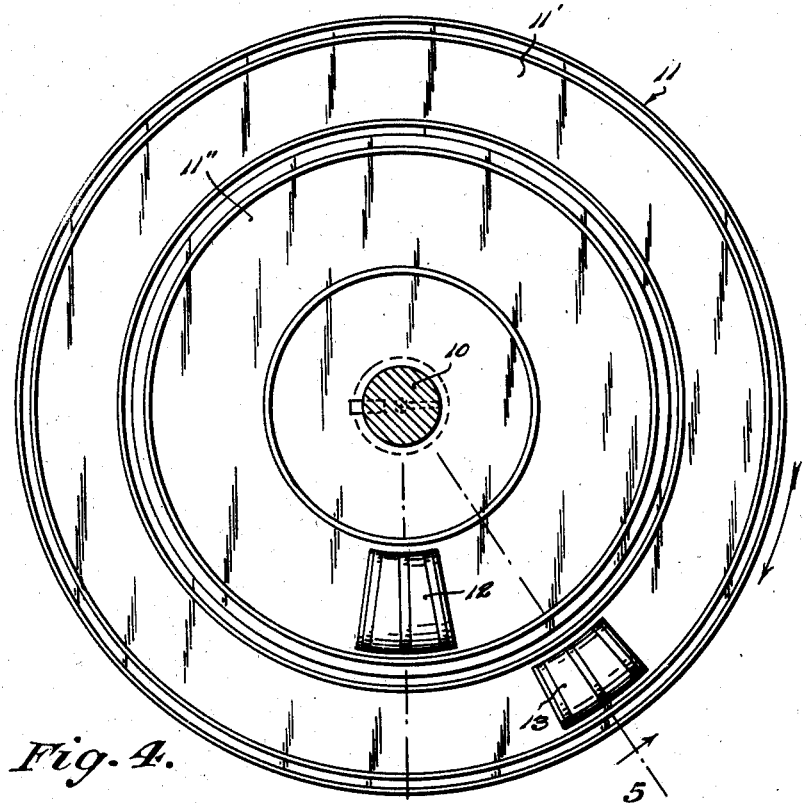
INVENTOR
Virgil David Canfield
BY
ATTORNEY July 14, 1942.   V. D. CANFIELD   2,289,342
ROTARY ENGINE
Filed Aug. 17, 1940   4 Sheets-Sheet 4

INVENTOR.
Virgil David Canfield
BY
ATTORNEY.

Patented July 14, 1942

2,289,342

UNITED STATES PATENT OFFICE 2,289,342

ROTARY ENGINE

Virgil David Canfield, Vashon, Wash.

Application August 17, 1940, Serial No. 353,048

7 Claims. (Cl. 123—16)

This invention relates to rotary internal combustion engines; and its object is to provide an engine of this character assuring a more efficient utilization of the power medium. In the accomplishment of such end the invention resides in a rotary engine capable of performing, in each revolution, compression of an admixture of a hydro-carbon and air into an effective explosive mixture simultaneously with the explosion of a fuel charge compressed in a preceding revolution of the engine, and resides further in a rotary two-cylinder engine of alternating-fire type in which a single piston is common to both explosion cylinders and is arranged in a manner to obtain a relatively constant drive pressure in that the expansion force of a freshly ignited fuel charge is exerted on the explosion cylinder immediately following the spending of a previous charge, each explosive force carrying through a complete revolution of the engine but being augmented following a half-revolution by the firing of the complementary cylinder.

Having the foregoing and other and more particular objects and advantages in view, the invention consists in the novel construction and in the adaptation and combination of parts hereinafter described and claimed.

An embodiment of the invention is illustrated in the accompanying drawings, wherein:

Fig. 4 is an elevational view of the rotor and piston assembly and showing the engine shaft in section.

Fig. 5 is a broken section on line 5—5 of Fig. 4.

Figure 6:
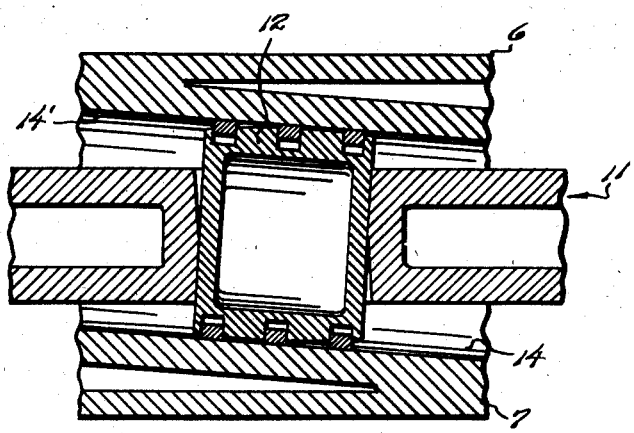
Figure 7:
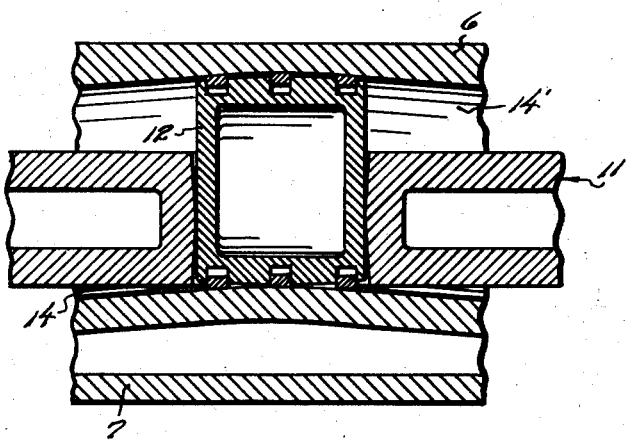

Figs. 6 and 7 are fragmentary vertical sections to an enlarged scale taken approximately on the axial line of a piston track, the former view midway and the latter view at the substantial extreme of a piston's axial travel, to detail the spherical contour characterizing the end walls of piston-receiving slots which are provided in the rotor element of the engine and which act to accommodate a rocking movement of the pistons as the same travel circumferentially with the rotor. It is here pointed out that the clearances necessary to permit such rocking movement, and which are provided by such spherical surfaces, are deleted from the illustration of the engine in Figs. 1 through 5 in order, through the somewhat schematic showing thereby permitted, to simplify the drawings.

In carrying out the invention I provide a circular casing comprised of two substantially similar parts 6 and 7 connected by bolts 8 and producing a cylindrical chamber therebetween. Lying in concentric relation to this chamber, the engine shaft 10 is journaled through suitable boxes provided on or formed integral with the casing parts, and keyed or otherwise fixedly secured to the shaft for rotary movement within the chamber is a cylindrical wheel or rotor 11. Said rotor is of step-down construction, which is to say that an outer portion 11' is formed with a width reduced from that of an inner portion 11'', and provided in each of these portions is a through opening, the openings functioning as slide chambers for pistons 12 and 13. Being produced to a circular form in end elevation, the pistons as best represented in Fig. 5 are given a diameter exceeding by approximately two-thirds the width of the related portion of the rotor, an arrangement which permits the perimetrical line of the piston to be brought into flush relation with one face of the rotor while maintaining the center of the piston within the rotor.

Figure 1:
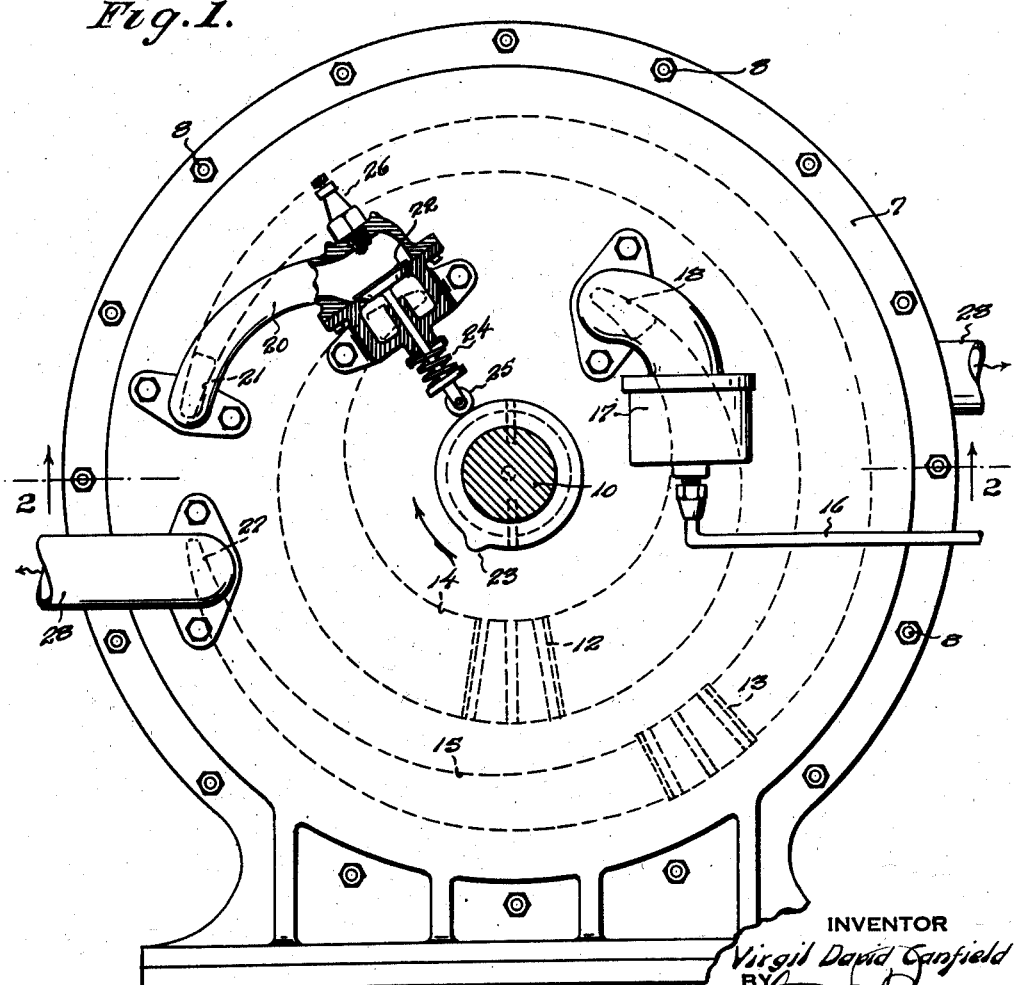
Figure 1 is a fragmentary front elevational view having parts broken away and shown in longitudinal vertical section.
Figure 2:
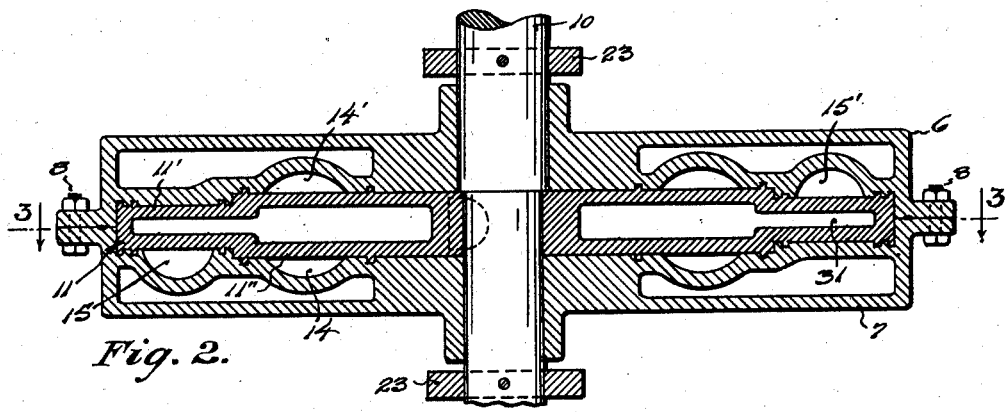
Fig. 2 is a horizontal section on line 2—2 of Fig. 1.
Figure 3:
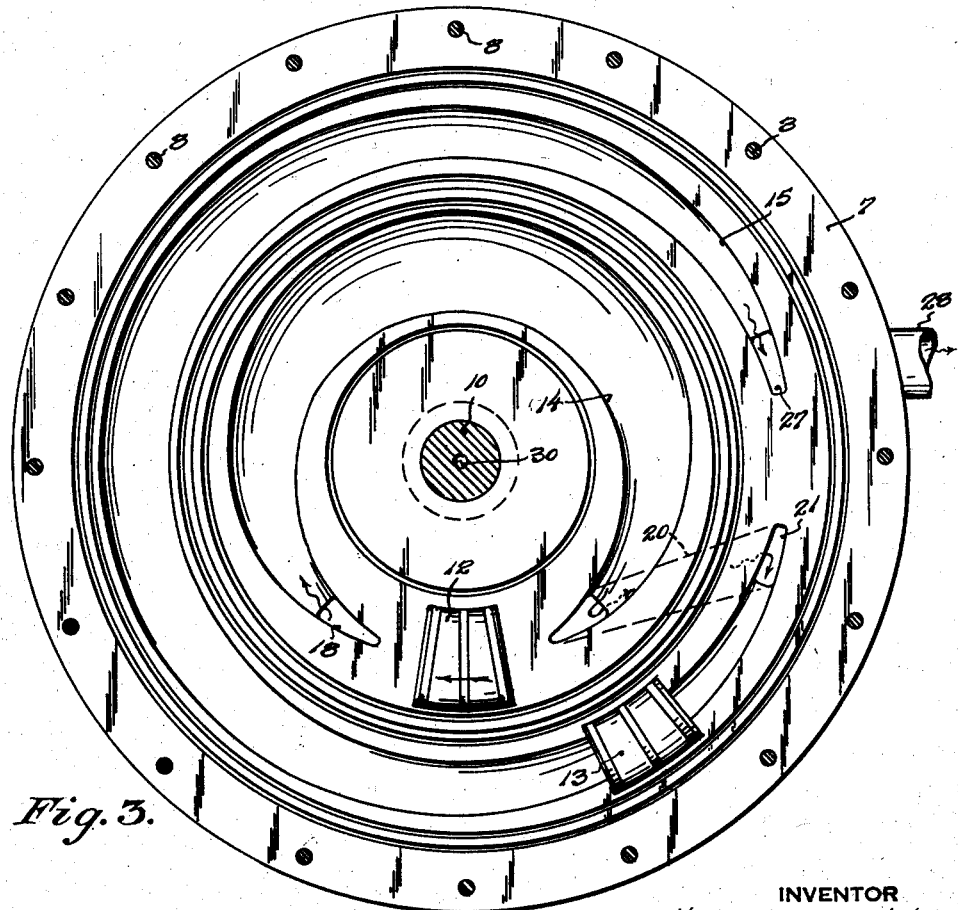
Fig. 3 is a longitudinal vertical section on line 3—3 of Fig. 2 showing the pistons, one for compressing the fuel charge and the other for driving the engine shaft under the impetus of an explosion, in their relative positions following the explosion of a compressed fuel charge, but deleting the rotor which carries said pistons.

Accommodating the segmental extensions of the pistons in the travel of the latter circumferentially with the rotor about shaft 10 as an axis, the said casing parts at each side of the rotor chamber are, in the instance of the part 7, cavitated as at 14 and 15 and, in the instance of the part 6, cavitated as at 14' and 15'. These cavitations are produced as segments of circles the radii of which are in correspondence with the radii of the pistons accommodated thereby, and as best represented in Fig. 2 considered in connection with the disclosure of Fig. 5, the two cavitations 14 and 14', one being produced in the casing part 7 and the other in the casing part 6, complement one another to form one cylinder extending as a ring in relatively concentric relation to the shaft 10, and the two cavitations 15 and 15' likewise complement one another to form another and surrounding cylinder similarly extending as a ring in relatively concentric relation to the shaft 10, each of these cylinders being characterized in that the same are orbitally generated on planes oblique to the plane of the rotor and such as to be traversed throughout their circumference by the rotor. It is believed to be clear from the foregoing that the pistons substantially fit the cylinders, which is to say that the same throughout their circumferential travel closely seat against the floor surfaces of the cavitations provided in each of the casing parts, these floor surfaces in the one casing part progressively increasing and then decreasing as to depth throughout a revolution of the piston and the floor surfaces of the other casing part being given a changing depth in inverse correspondence thereto. It will be understood that the pistons, in their circumferential travel with the rotor, each travel in and substantially trace the generating orbit of the related cylinder and in consequence develop a slight rocking action in relation to the rotor, and to permit this rocking movement the end walls of the openings in the rotor which receive the pistons are given a slightly spherical contour as indicated in each of Figs. 6 and 7. It is to be understood that this spherical end-wall contour characterizes the opening which receives the piston 13 as well as the opening which receives the piston 12. While for simplicity in illustration I have deleted the same from the drawings, laminated metal packing is carried in suitable recesses therefor provided in the rotor and bears against the front and back facing surfaces of the pistons, the laminations being applied parallel to the plane of the rotor and being individually influenced by springs or an equivalent expansive agent into sealing engagement with the end face of the piston. Said cylinders 14 and 14', accommodating the larger piston 12, function in the engine as compression cylinders and will be hereinafter referred to as such. The cylinders 15 and 15', accommodating piston 13, act as the explosion cylinders and receive their fuel charges from the compression cylinders.

Fluid conducting structure is provided at one side of the casing for said cylinders 14 and 15, like structure being provided at the other side of the casing for the cylinders 14' and 15'. Describing the structure, it will be seen from an inspection of Figs. 1 and 3 that fuel is supplied through a pipe 16 to a carburetor 17 and thence through a port 18 into the admission end of the compression cylinder, and from the discharge end of the latter carries through a valved conduit 20 into the admission end of the explosion cylinder, the admission port being represented at 21. Valve 22 in said conduit 20 is intermittently opened by any suitable timed operating mechanism, as by a cam 23 on the engine shaft acting in opposition to a spring 24 to lift a roller 25 mounted on the valve spindle. A spark plug for the ignition of the compressed fuel charge is represented at 26, and 27 indicates the exhaust port which lies at the discharge end of the explosion cylinder and connects with an exhaust pipe 28.

The casing parts 6 and 7 are or may be water-cooled by jacketing as shown or, if desired, the engine may be finned for air cooling. Oil for lubrication is supplied from a duct 30 in the shaft to a reservoir 31 within the rotor and thence through pore-like ducts 32, shown greatly exaggerated in Fig. 5, to the wearing surfaces of the engine. As packing rings between the rotor and the casing parts I represent a number of tongue elements formed integral with the one and fitting in grooves of the other, an arrangement which I find to be more efficient than loose rings.

The operation is believed to be clearly understood from the foregoing description taken in connection with the drawings. This understanding might be clarified by stating that each of the cavitations in and of itself functionally constitutes a cylinder, toroidal in nature. Formed by each of such cylinders is a gas chamber in front of as well as in back of the related piston, the former chamber being reduced and the latter increased in its volumetric capacity progressively with the travel of the piston in a complete revolution. Considered in terms of an explosion cycle, one revolution of the piston 12 acts by suction to draw carbureted fuel into the toroidal cylinder 14, which fuel is compressed in a following revolution. The compressed gases are then passed into the toroidal cylinder 15 in back of the piston 13 and fired by the plug 26 to drive the piston 13, the spent gases exhausting into the atmosphere as the piston clears the port 27. Simultaneously with this cyclical performance, a similar engine cycle is being carried out—delayed as to its initiation by 180°—on the other side of the rotor, which is to say in the toroidal cylinders 14' and 15'.

It will of course be obvious that multiples of the engine shown may be used upon a single shaft arranged to still further equalize pressures and obviate as much as practicable friction at the shaft bearings.

I intend to imply no limitations excepting as the same are necessarily introduced to the hereto annexed claims to define the advance in the art.

What I claim is:

1. In a rotary internal combustion engine: the combination of an engine shaft; a stationary casing formed to define two radially spaced chambers lying relatively concentric to the shaft and generated by circles moving through orbital paths oblique to an equitorial taken about the shaft as an axis, and also providing a cylindrical chamber exposed to the shaft and having an axial length less than the diameter of the circles from which the first-named chambers are generated and so arranged in relation to such first-named chambers as to obtain a traversal of the latter through the entire circumference thereof; a rotor fixedly secured on the shaft and received in said cylindrical chamber to divide the first-named chambers correspondingly with their traversal by the cylindrical chamber and by such division define, from each of the first-named chambers, a pair of toroidal cylinders of which the one lies at one and the other at the other side of the rotor, said rotor providing openings therethrough located in radial correspondence with said first-named chambers and produced to a width corresponding to the diameter of the circles from which said chambers are generated; and pistons of a circular form in end elevation, the radii corresponding to the circular generatrixes of the toroidal cylinders, received through said rotor openings into seating engagement with the toroidal cylinders and by travel with the rotor tracing the oblique orbits of the generatrixes of said cylinders.

2. A rotary internal combustion engine according to claim 1 including a means for supplying carbureted gases to one pair of said toroidal cylinders and wherein the cylinders so supplied have a volumetric capacity exceeding that of the other pair of toroidal cylinders and, acting to compress the carbureted gases, have communication with the latter cylinders for presentation of explosive charges thereto.

3. A rotary internal combustion engine according to claim 1 characterized in that the circular generatrixes of the toroidal cylinders have a diameter exceeding by approximately one-half the axial length of the rotor openings.

4. In a rotary internal combustion engine: the combination of an engine shaft; a stationary casing providing a cylindrical chamber and having each end wall of said chamber cavitated to provide a toroidal cylinder concentric to the shaft, the cylinder in one of said end walls being a reverse counterpart of the cylinder formed in the other end wall and being each generated by circles moving through orbital paths oblique to an equitorial taken about the shaft as an axis; a rotor having connection with the shaft and working in said cylindrical chamber; and rotor-carried means functioning as pistons for the toroidal cylinders slidable in the rotor axially of the shaft.

5. A rotary internal combustion engine according to claim 4 wherein the pistons substantially fit the cylinders and, to compensate for the oblique orbital travel circumferentially about the same, are arranged for rocker movement in relation to the rotor.

6. In a rotary internal combustion engine: the combination of an engine shaft; a stationary casing providing a cylindrical chamber and having each end wall of the chamber cavitated to provide pairs of radially spaced toroidal cylinders concentric to the shaft and characterized in that the toroidal cylinders in one end wall find a reverse counterpart in the toroidal cylinders of the other end wall; a shaft-connected rotor working in said cylindrical chamber and formed with openings therethrough located in radial correspondence with the radially spaced sets of toroidal cylinders; connection from a fuel source to the emanating ends of each of the toroidal cylinders of one of said sets; a valved connection from the terminating ends of each of the last-named cylinders leading to the emanating end of the other toroidal cylinder at the related side of the rotor; means for igniting fuel charges delivered through the valved connection to the last-named cylinders; exhaust connections from the terminating ends of the cylinders last mentioned; rotor-carried pistons for the respective cylinders received through the openings of the rotor and by travel with the rotor tracing the orbital paths of generation of the toroidal cylinders; and means timed from the shaft for controlling the valve in said valved connection to have fuel charges pass from the first-mentioned to the last-mentioned sets of toroidal cylinders immediately following travel of the related piston by the cylinder port which is fed from said valved connection.

7. A rotary internal combustion engine according to claim 6 characterized in that the cylinders are generated by circles moving through orbital paths oblique to an equitorial taken about the shaft as an axis.

VIRGIL DAVID CANFIELD.